US005375309A

United States Patent [19]

Dunn

[11] Patent Number: 5,375,309

[45] Date of Patent: Dec. 27, 1994

[54] HAND HELD TOOL FOR INSERTING A CYLINDRICAL INSERT IN AN OPEN END OF A TUBE

[75] Inventor: Michael R. Dunn, Sandy, Utah

[73] Assignee: Trebor Incorporated, West Jordan, Utah

[21] Appl. No.: 94,751

[22] Filed: Jul. 19, 1993

[51] Int. Cl.$^5$ .............................................. F16L 35/00

[52] U.S. Cl. ...................................................... 29/237

[58] Field of Search .......................... 29/239, 237, 234; 269/6

[56] References Cited

U.S. PATENT DOCUMENTS

| | | | |
|---|---|---|---|
| 1,094,978 | 4/1914 | Church | 29/237 |
| 2,916,812 | 12/1959 | Milo | 29/237 |
| 3,705,581 | 12/1972 | Drake | 29/239 |
| 3,727,289 | 4/1973 | Bemelmann et al. | 29/237 |
| 4,222,577 | 9/1980 | Giffin | 229/114 |
| 4,483,056 | 11/1984 | Schwalm et al. | 29/237 |
| 4,623,154 | 11/1986 | Ise et al. | 279/114 |

*Primary Examiner*—Robert C. Watson
*Attorney, Agent, or Firm*—Terry M. Crellin

[57] ABSTRACT

A hand held tool for inserting a forward end of a cylindrical insert member into an open end of a relatively thick-walled plastic tube. The tool comprises a pistol grip having a hand engaged member that is squeezed by one's hand. A push shaft is positioned at the top end of the pistol grip, with the push shaft having a forward end that extends away from the pistol grip. The hand engaged member cooperates with a mechanism for moving the push shaft forward in longitudinal movement along the longitudinal axis of the push shaft when the hand engaged member is squeezed. A housing extends from the pistol grip around and along the push shaft, with a distal end of the housing extending beyond the forward end of the push shaft. An access opening is provided in the housing through which the forward end of the push shaft is accessible for positioning the cylindrical insert member in axial alignment with the longitudinal axis of the push shaft at the forward end of the push shaft. A gripping mechanism is provided at the distal end of the housing for gripping the open end of the plastic tube and holding the open end of the tube in axial alignment with the longitudinal axis of the push shaft. As the forward end of the push shaft moves forward, it engages the cylindrical insert member and forces the leading end of the cylindrical insert member into the open end of the plastic tube.

4 Claims, 3 Drawing Sheets

HAND HELD TOOL FOR INSERTING A CYLINDRICAL INSERT IN AN OPEN END OF A TUBE

BACKGROUND OF THE INVENTION

1. Field of the Invention

The present invention relates to improvements in devices for inserting cylindrical insert members in the open ends of relatively thick-walled plastic tubing. In particular, the present invention relates to a hand held, portable tool for inserting the cylindrical inserts into open ends of plastic tubing.

2. State of the Art

In the manufacturing of integrated circuit chips, it has been necessary because of cleanliness requirements and the corrosive nature of the chemicals used to employ fluid handling system, including chemical pumps and piping, that are formed from chemically resistant plastic components such as fluoroplastic materials, including polytetrafluoroethylene and perfluoroalkoxy. Tubing and fittings must be made of the plastic components so that the liquids being conveyed come in contact with only components that are mad of chemically resistant plastic material. Tubing and fittings must be capable of high temperatures and high pressures that are commonly used in the chemical systems employed in industries requiring high-purity fluid handling.

To withstand pressure and temperature requirements, the tubing is relatively thick-walled, having thicknesses of about 3/64 inch for $\frac{1}{4}$ inch outside diameter tubing up to about $\frac{1}{8}$ inch for tubing having an outside diameter of $\frac{3}{8}$ inch or greater. Flare fittings have been used in the past wherein the ends of the tubing are heated and flared. Recently, improved fittings have been developed which utilize so-called cold flaring. In such fittings, a cylindrical insert member is inserted into the open end of the tube. The insert member has an outside diameter that is larger than the inside diameter of the tube in which it is to be inserted. In addition, an enlarged torus is provided at the end of the insert member which is to be inserted in the tube. The torus expands the open end of the tube to make a flare in the tube.

The insert is forced into the end of the tube at ambient temperature, and the fittings have been referred to as cold-insert flare fittings. The fittings have found wide use in the manufacture of semiconductor and other electronic products. One inherent problem with such fittings is the large force necessary to push the insert member into the end of the relatively thick-walled tubing. Large, bulky, bench-mounted apparatus is presently used to force the insert member into the end of the tubing. However, such bulky, bench-mounted apparatus is not easily moved, and thus when maintenance is needed on a fitting in an operating areas such as within a wet bench production facility in the semiconductor industry, the fittings and tubing must be removed and carried to the nearest bench-mounted apparatus for repair. I would be highly desirable to have portable, hand held and hand operated apparatus that could be moved to the site of the tubing installation to allow maintenance to be conducted at the site of the installation. Large savings in downtime and expense could be realized if repair and maintenance could be accomplished quickly at the site of the tubing installation instead of removing the tubing and fittings to a remote area for repair and maintenance.

SUMMARY OF THE INVENTION

It is a principal objective of the present invention to provide a small, inexpensive, hand held tool capable of quickly and easily inserting a cylindrical insert member into an open end of a tube. Advantageously, such hand held tool can be used at the site of the tubing installation for repair and maintenance of the tubing as well as for installation of new tubing systems. This objective is achieved in accordance with the present invention by providing novel, hand held tool that has a push shaft positioned near a top end of a pistol grip. The push shaft has a forward end that extends away from the pistol grip.

Manually actuated means are provided in association with the pistol grip for moving the shaft forward in longitudinal movement along the longitudinal axis of the push shaft. A housing means is provided to extend from the pistol grip around and along the push shaft. The distal end of the housing means extends beyond the forward end of the push shaft. An access opening is provided in the housing through which the forward end of the push shaft is accessible for positioning a cylindrical insert member in axial alignment with the longitudinal axis of the push shaft at the forward end of the push shaft.

Gripping means, such as an adjustable chuck, is provided at the distal end of the housing means that extends from the pistol grip. The gripping means is adapted to grasp and hold the open end of a plastic tube, with the open end of the tube being held securely in axial alignment with the longitudinal axis of the push shaft, whereby the cylindrical insert member is positioned between the push shaft and the open end of the plastic tube. As the manually actuated means associated with the pistol grip is actuated, the push shaft moves so that the forward end thereof engages the rearward end of the cylindrical insert member and forces the forward end of the insert member into the open end of the plastic tube.

Additional objects and features of the invention will become apparent from the following detailed description, taken together with the accompanying drawings.

THE DRAWINGS

A preferred embodiment of the novel tool of the present invention representing the best mode presently contemplated of carrying out the invention is illustrated in the accompanying drawings in which.

DETAILED DESCRIPTION OF THE ILLUSTRATED EMBODIMENT

Figure 1:
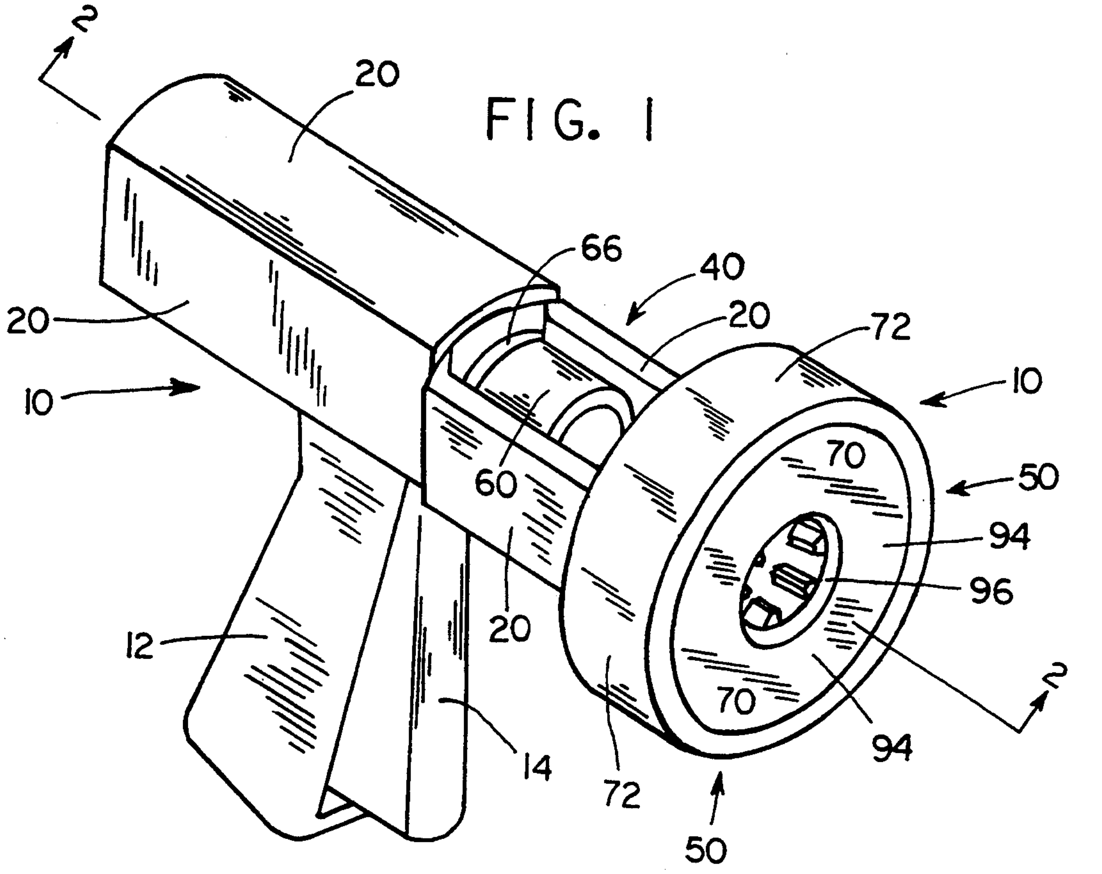
FIG. 1 is a pictorial representation of a hand tool of the present invention.

Referring now to the drawings, there is shown a novel, hand tool 10 in accordance with the present invention. The hand tool 10 comprises a pistol grip 12 that has a hand engaged lever 14 that can be squeezed by one's hand to move from a rest position toward the pistol grip 12 and then return to the rest position when the lever 14 is not being squeezed. This action is similar to the common squeeze action of a cartridge-type caulking gun.

Further, like a conventional caulking gun, a push shaft 16 is positioned near the top end of the pistol grip 12. The push shaft 16 has a forward end that extends away from the pistol grip 12. Means are associated with the lever 14 for moving the push shaft 16 in longitudinal movement along the longitudinal axis of the push shaft 16 when the lever 14 is squeezed. A mechanism similar to that used in a caulking gun can be used to move the push shaft 16 forward in incremental, longitudinal movement each time the lever 14 is squeezed.

As illustrated, the lever 14 is pivotally attached about a pivot axis 18 to a housing 20. The housing 20 extends from the top of the pistol grip 12 around and along the push shaft 16. The proximal end of the housing 20 extends from the backward side of the pistol grip 12, and the distal end of the housing 20 extends from the forward side of the pistol grip 12 and beyond the forward end of the push shaft 16. The push shaft 16 is mounted through aligned openings 22 in inside baffle plates 24 and 25 of the housing 20.

A spring 26 is positioned between the backward baffle plate 24 and a retainer 28 on the proximal end of the push shaft 16. As the push shaft 16 is moved in longitudinal movement toward the distal end of the push shaft 16, the spring 26 is compressed. The compression in the spring 26 will be used to return the push shaft 16 to its initial, unextended position at the end of the operation of inserting an insert member into a tube as will be described further hereinafter.

The lever 14 is pivotally attached to housing 20 about a pivot axis 18 that is located between the backward baffle plate 24 and the forward baffle plate 25. The push shaft 16 extends through an opening in the lever 14, and the lever 14 has an upper cam 15 that contacts a pair of drive lugs 30 that are positioned adjacent to the front of the cam 15 of the lever 14. The push shaft 16 passes through aligned openings in the drive lugs 30. When the lever 14 is squeezed, the cam 15 pushes the upper ends of the drive lugs 30 forward. The drive lugs 30 tend to cant and the openings therein wedge against the drive shaft 16 and force the drive shaft 16 forward. When the lever 14 is released, it is returned to its unsqueezed, rest position by the action of spring 32 that is positioned between the lever 14 and a locking lever 34 positioned on the forward face of the backward baffle plate 24.

As the lever 14 returns to its rest position, a spring 36 pushes the drive lugs 30 back along the push rod 16 and against the forward face of the cam 15 of the lever 14. The locking lever 34 prevents the push shaft 16 from retracting when the lever 14 returns to its rest position. The locking lever 34 has an opening through which the push shaft 16 passes, but an L-shaped leg of the locking lever 34 engages the forward side of the baffle plate 24 such that the position of the locking lever 34 having the opening through which the push shaft 16 passes is canted with respect to the push shaft 16 such that any backward movement of the push shaft 16 results in binding of its push shaft 16 in the opening of the locking lever 34. The push shaft 16 can move forward through the opening in the locking lever 34 but cannot move backwardly through that opening. Repeated squeezing of the hand lever 14 thus causes the push shaft 16 to move forward in incremental, longitudinal movements along the longitudinal axis of the push shaft 16.

Although not illustrated, it is to be recognized that other means could be used in association with the pistol grip 12 for moving the push shaft 16 forward. The hand lever 14 as shown in the drawings could be associated with a hydraulic system that develops hydraulic pressure each time the lever 14 is squeezed. The hydraulic pressure could in turn be applied to a piston at the back end of the housing 20 that would drive the push shaft 16 forward. Alternatively, the hand lever 14 or a simple trigger could be used to activate a pneumatic cylinder at the back end of the housing 20 that would drive the push shaft 16 forward. Air under pressure would be provided to the gun, and the hand lever 14 or a trigger would simple control the feed of the pressurized air to the pneumatic cylinder at the back end of the housing 20. In an additional alternative, the hand lever 14 or a trigger could be used as an on-off switch as are common with portable electric drills. An electric motor in the housing 20 would then drive the push shaft 16 forward. Power for the electric motor could be provided by onboard batteries or from electrical power supplied through a power cord.

An access opening 40 is provided in the portion of the housing 20 that extends from the pistol grip 12 such that the forward end of the push shaft 16 is accessible for positioning a cylindrical insert member 42 in axial alignment with the longitudinal axis of the push shaft 16 at the forward end of the push shaft 16. As illustrated, the opening 40 is provided in the top side of the portion of the housing 20 that extends from the pistol grip 12.

Gripping means 50 are provided at the distal end of the housing 20 for gripping the open end of a plastic tube 52 and holding the open end of the tube 52 in an axial alignment with the longitudinal axis of the push shaft 16 such that the cylindrical insert member is positioned between the push shaft 16 and the open end of the plastic tube 52. As the forward end of the push shaft moves forward away from the pistol grip 12, it engages the back end of the cylindrical insert member 42 and forces the front end of the insert member 42 into the open end of the plastic tube 52.

It is, if course, advantageous to provide means for withdrawing the push shaft 16 backwardly away from the insert member 42 toward the pistol grip 12 once the insert member 42 has been properly inserted in the open end of the tube 52. As illustrated, the locking lever 34 has a rearwardly extending leg 35 that can be pressed downwardly from the back end of the housing 20. Pressing the leg 35 of the locking lever 34 downwardly tends to rotate the locking lever 34 about its upper end such that the opening in the locking lever 34 releases its grip on the push shaft 16 and allows the push shaft 16 to move rearwardly under the biasing force of the spring 26. When the push shaft 16 has been withdrawn to its rest position and a new tube has been positioned in the gripping means 50, the operation of inserting an insert member into the open end of the tube can be repeated.

It is advantageous to provide a removable adapter member 60 in the access opening 40 to hold the insert member 42 in a stable position for being forced into the open end of the tube 52. The adapter member 60 can also be readily exchanged by an of a number of different sized adapter members for inserting insert members 42 into various sized tubes 52. The adapter member has opposite forward and rearward ends 62 and 64. The forward end 64 has a recessed cavity into which the rearward end of the cylindrical insert member 42 is received in a snug fit. The recessed cavity holds the cylindrical insert member 42 in a stable position to be inserted into the tube 52.

The rearward end 62 of the adapter member 60 is mounted adjacent to the forward end of the push shaft 16. In the embodiment shown, the distal end of the shaft 16 is provided with a flat disc 66, and the rearward end 62 of the adapter member 60 is provided with a shallow recess that receives the flat disc 66 of the push shaft 16. The flat disc is made of a material that can be attracted by a magnet, and a flat piece 67 of magnetic material is adhered to the shallow recess in the backward end of the adapter member 60. The piece 67 of magnetic material is magnetically engaged with the disc 66 of the push shaft 16 when the adapter member 60 is positioned on the disc 66 of the push shaft 16. It is to be recognized that other means of engaging the backward end of the adapter member 60 to the push shaft 16 could be used. For example, a mortise and tenon could be used to provide interengagement between the adapter member 60 and the forward end of the push shaft 16. Irrespective of the means for mounting the adapter member 60 to the forward end of the push shaft 60, the adapter member 60 is removably positioned in the housing 20 through the access opening 40 such that one adapter member 60 for one size of insert and tubing can quickly and easily be replaced with another adapter member for a different size of insert and tubing.

The gripping means 50 at the distal end of the housing 20 preferably comprises a plurality of gripping elements 70. Means are provided for mounting the gripping elements 70 spaced apart from each other, with the gripping elements 70 being oriented in a substantially circular pattern or orientation. Each of the gripping elements 70 are movable in a radial direction from a common center so as to move toward and away from the common center. The common center is in alignment with the longitudinal axis of the push shaft 16. The gripping elements 70 can be moved away from the common center such that the tube 52 can be positioned in alignment with the longitudinal axis of the push shaft 16, with the gripping elements 70 encircling the perimeter wall of the tube 52 adjacent to the open end of the tube 52.

An annular collar 72 surrounds the gripping elements 70 and forms a perimeter of the gripping means 50. The annular collar 72 is rotatable about an axis that is coaxial with the longitudinal axis of the push shaft 16. Means are associated with the annular collar 72 for moving the gripping elements 70 in uniform movement toward and away from said common center, such that when the annular collar 72 is rotated in one direction, the gripping elements 70 move in uniform movement away from said common center so that the tube 52 can be positioned within the open circle formed by the gripping elements 70. When the annular collar 72 is rotated in the opposite direction, the gripping elements 70 move in a uniform movement toward the common center to grip the perimeter wall of the tube 52 that is positioned within the circle formed by the gripping elements 70.

Figure 4:
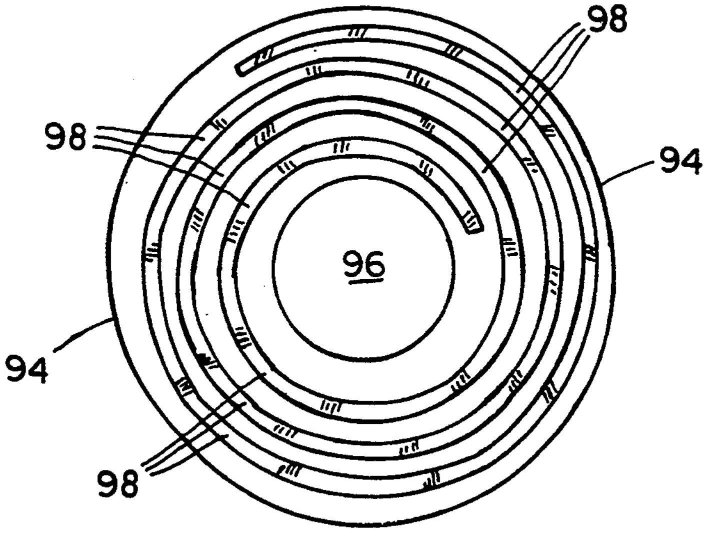
FIG. 4 is an elevational view of the inside surface of the distal of the chuck device as taken along line 4—4 of FIG. 3.
Figure 2:
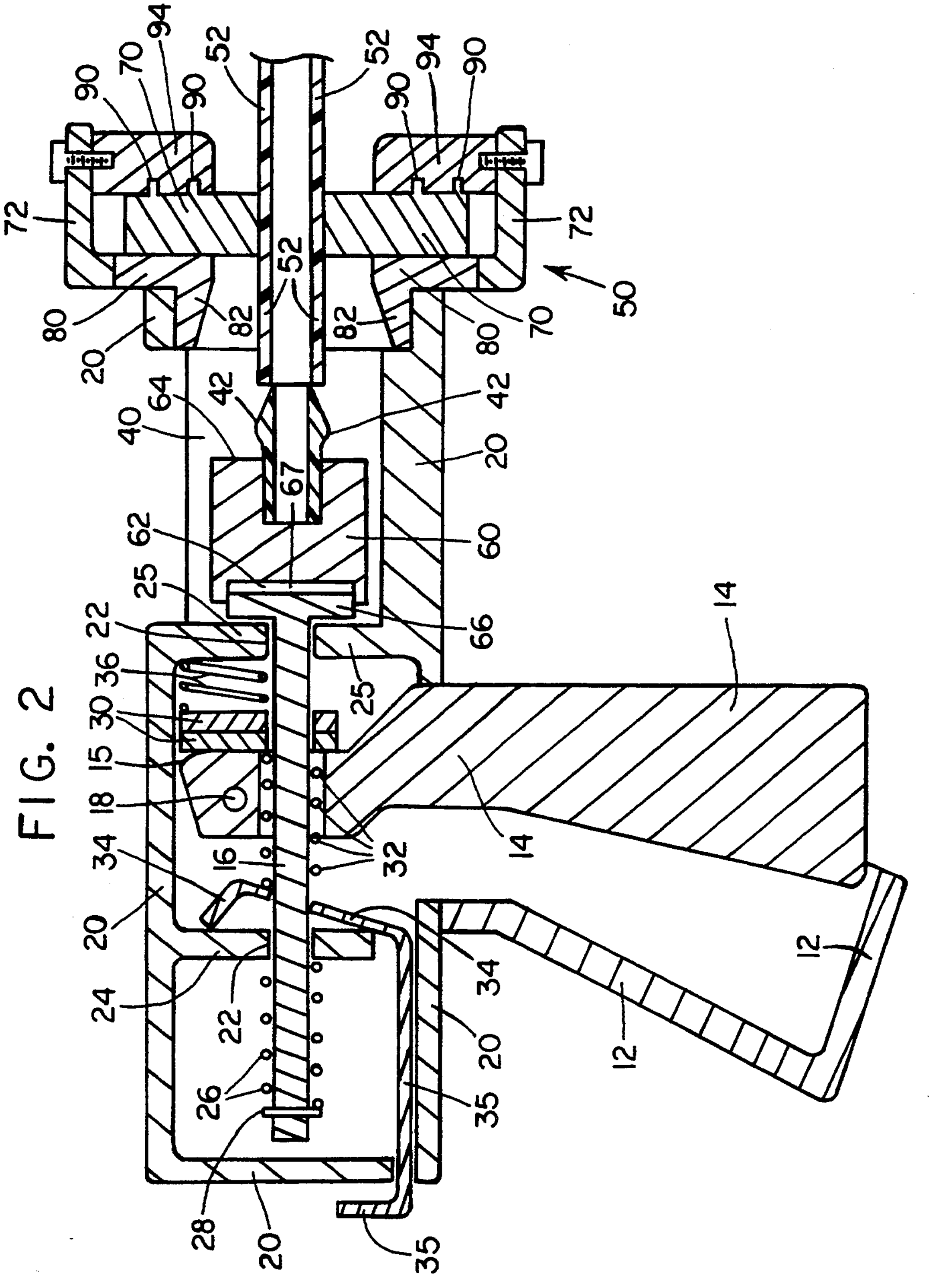
FIG. 2 is a cross section through the hand tool of FIG. 1 taken along line 2—2 of FIG. 1.
Figure 3:
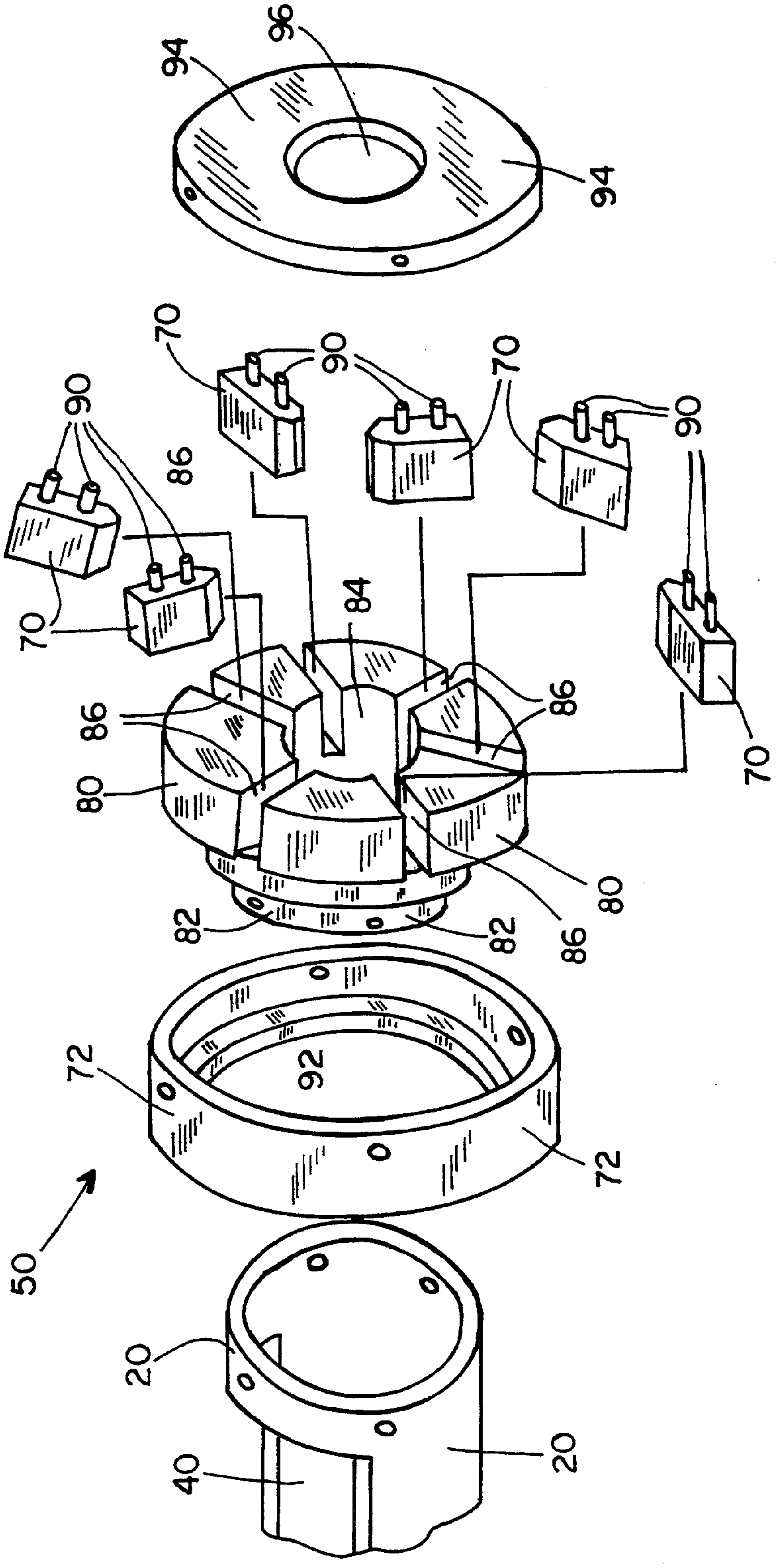
FIG. 3 is an exploded pictorial view of the adjustable chuck device and its attachment to the housing of the hand tool of FIG. 1.

Preferably, as shown in FIGS. 2–4 the gripping means 50 comprises a chuck body 80 that has an inner cylindrical rim 82 that fits snugly within the distal end of the housing 20 and is firmly attached to the distal end of the housing 20. The chuck body has a central opening 84 therein, and a plurality of radially extending, rectangular grooves 86 is provided in the forward face of the chuck body 80. The grooves 86 extend radially from the center of the central opening 84, and the center of the central opening is in alignment with the longitudinal axis of the push shaft 16.

A plurality of rectangular gripping elements 70 are provided, one gripping element 70 for each rectangular groove 86 in the chuck body 80. The gripping elements 70 can move radially in the rectangular grooves toward and away from the center of the central opening 84. At least two spaced apart projections 90 are provided on each of the gripping elements 70. The projections 90 extend forward away from the chuck body 80 when the gripping elements 70 are received in the respective rectangular grooves 86.

The annular collar 72 is received over the chuck body 80 from the back end of the chuck body 80. An annular lip 92 is provided on the annular collar 72 that engages the back side of the chuck body 80. An outer face plate 94 is attached to the forward end of the annular collar 72 so as to lie adjacent to the forward face of the chuck body 80. The face plate 94 is attached to the annular collar 72 so that it can rotate with the annular collar 72. A central opening 96 is provided in the face plate 94, with the central opening 96 in the face plate 94 being coaxial with the central opening 84 in the chuck body 80.

The inside face of the face plate 94, i.e., the face that faces the chuck body 80, is provided with a spiral groove 98 as shown in FIG. 4, that spirals inwardly from the perimeter of the face plate 94 toward the central opening 96 in the face plate 94. The spaced apart projections 90 in each of the gripping elements 70 are received in the spiral groove 98. As the annular collar 72 and the face plate 94 attached thereto rotate, the gripping elements move in the rectangular grooves 86 in the chuck body 80 in response to the projections 90 on the gripping elements being forced inwardly and outwardly by the spiral 98 in the inside face of the face plate 94.

Although a preferred embodiment of a hand tool in accordance with the present invention has been illustrated and described, it is to be understood that the present disclosure is made by way of example and that various other embodiments are possible without departing from the subject matter coming within the scope of the following claims, which subject matter is regarded as the invention.

I claim:

1. A hand held tool for inserting a forward end of a cylindrical insert member having opposite forward and rearward ends into an open end of a relatively thick-walled plastic tube, wherein said insert member has an outside diameter that is greater than the inside diameter of said tube, said tool comprising a pistol grip having a hand engaged member that can be squeezed by one's hand to move from a rest position toward the pistol grip and then return to the rest position when it is not being squeezed;

a push shaft positioned near a top end of said pistol grip, said push shaft having a forward end that extends away from said pistol grip;

means associated with said hand engaged member for moving said push shaft forward in longitudinal movement along the longitudinal axis of said push shaft when the hand engaged member is squeezed, whereby said forward end of said push shaft moves away from said pistol grip when the hand engaged member is squeezed;

housing means extending from said pistol grip around and along said push shaft, with a distal end of said housing extending beyond the forward end of said push shaft;

an access opening in said housing through which the forward end of said push shaft is accessible for positioning said cylindrical insert member in axial alignment with the longitudinal axis of said push shaft at the forward end of said push shaft;

an adapter member having opposite forward and rearward ends, with the forward end of said adapter member having a recessed cavity into which the rearward end of said cylindrical insert member is received, said adapter being removably positioned in said housing through the access opening in said housing so that the rearward end of said adapter member is mounted adjacent to the forward end of said push rod, whereby one adapter for one size of insert and tubing can quickly and easily be replaced with another adapter for a different size of insert and tubing; and gripping means at the distal end of said housing for gripping the open end of said plastic tube and holding the open end of the tube in axial alignment with said longitudinal axis of said push shaft such that the cylindrical insert member is positioned between said push shaft and said open end of said plastic tube, whereby as the forward end of said push shaft moves away from said pistol grip, it engages said cylindrical insert member and forces said one end of said cylindrical insert member into the open end of the plastic tube.

2. A hand held tool in accordance with claim 1 further including means for releasing the push shaft so that the forward end thereof can be moved toward the pistol grip after the one end of said cylindrical insert member has been forced into the open end of the plastic tube.

3. A hand held tool in accordance with claim 1 wherein the adapter member is magnetically engaged with the forward end of said push rod.

4. A hand held tool for inserting a forward end of a cylindrical insert member having opposite forward and rearward ends into an open end of a relatively thick-walled plastic tube, wherein said insert member has an outside diameter that is greater than the inside diameter of said tube, said tool comprising a pistol grip having a hand engaged member that can be squeezed by one's hand to move from a rest position toward the pistol grip and then return to the rest position when it is not being squeezed;

a push shaft positioned near a top end of said pistol grip, said push shaft having a forward end that extends away from said pistol grip;

means associated with said hand engaged member for moving said push shaft forward in longitudinal movement along the longitudinal axis of said push shaft when the hand engaged member is squeezed, whereby said forward end of said push shaft moves away from said pistol grip when the hand engaged member is squeezed;

housing means extending from said pistol grip around and along said push shaft, with a distal end of said housing extending beyond the forward end of said push shaft;

an access opening in said housing through which the forward end of said push shaft is accessible for positioning said cylindrical insert member in axial alignment with the longitudinal axis of said push shaft at the forward end of said push shaft;

gripping means art the distal end of said housing for gripping the open end of said plastic tube and holding the open end of the tube in axial alignment with said longitudinal axis of said push shaft such that the cylindrical insert member is positioned between said push shaft and said open end of said plastic tube, said gripping means at the distal end of said housing comprising a plurality of gripping elements;

means for mounting the gripping elements spaced from each other in a substantially circular orientation, with each of the gripping elements being movable in a radial direction from a common center so as to move toward and away from said common center, with said common center being in alignment with the longitudinal axis of said push shaft, whereby the open end of said tube can be positioned in alignment with the longitudinal axis of said push shaft so that the gripping elements encircle the perimeter wall of said tube adjacent to said open end of said tube;

an annular collar surrounding the gripping elements and forming a perimeter of said gripping means, with said annular collar being rotatable about an axis that is coaxial with the longitudinal axis of said push rod; and means associated with said annular collar for moving the gripping elements in uniform movement toward and away from said common center, whereby when the annular collar is rotated in one direction, the gripping elements move in uniform movement away from said common center so that said tube can be positioned within said gripping elements, and when the annular collar is rotated in an opposite direction, the gripping elements move in uniform movement toward said common center to grip the perimeter wall of a tube that is positioned within said gripping elements, whereby as the forward end of said push shaft moves away from said pistol grip, it engages said cylindrical insert member and forces said one end of said cylindrical insert member into the open end of the plastic tube.

* * * * *